(12) United States Patent
Idziorek et al.

(10) Patent No.: US 9,367,501 B2
(45) Date of Patent: Jun. 14, 2016

(54) DYNAMIC STREAMING DATA DISPATCHER

(75) Inventors: Joseph R. Idziorek, Ames, IA (US); Vibhore Kumar, Atlanta, GA (US); Chitra Venkatramani, Roslyn Heights, NY (US); Rohit Wagle, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 713 days.

(21) Appl. No.: 13/293,822

(22) Filed: Nov. 10, 2011

(65) Prior Publication Data

US 2013/0124668 A1 May 16, 2013

(51) Int. Cl.
*G06F 15/167* (2006.01)
*G06F 13/38* (2006.01)
*H04L 12/803* (2013.01)

(52) U.S. Cl.
CPC ............ *G06F 13/385* (2013.01); *H04L 47/125* (2013.01)

(58) Field of Classification Search
CPC ... H04L 49/9052; H04L 47/10; H04L 47/122; H04L 47/125; H04L 47/50; H04L 29/08144; H04L 29/08153
USPC .................................................. 709/214, 231
See application file for complete search history.

(56) References Cited

U.S. PATENT DOCUMENTS

| | | | |
|---|---|---|---|
| 5,928,331 A | 7/1999 | Bushmitch | |
| 7,000,022 B2 | 2/2006 | Lisitsa et al. | |
| 7,243,172 B2 | 7/2007 | Oner et al. | |
| 7,809,851 B2 | 10/2010 | Klemets | |
| 7,869,440 B2 | 1/2011 | Lisitsa et al. | |
| 7,970,823 B2* | 6/2011 | Moeller et al. | 709/203 |
| 2002/0083118 A1* | 6/2002 | Sim | 709/105 |
| 2002/0156719 A1* | 10/2002 | Finebaum et al. | 705/37 |
| 2007/0185924 A1* | 8/2007 | Kawamura | 707/202 |
| 2007/0236511 A1* | 10/2007 | Molloy | 345/634 |
| 2008/0177803 A1* | 7/2008 | Fineberg et al. | 707/202 |
| 2010/0284271 A1* | 11/2010 | Ferguson et al. | 370/230 |
| 2010/0296521 A1 | 11/2010 | Martinez et al. | |
| 2010/0309783 A1* | 12/2010 | Howe | H04L 43/0852 370/230 |
| 2011/0047285 A1* | 2/2011 | Kampmann et al. | 709/231 |
| 2012/0084087 A1* | 4/2012 | Yang | G10L 17/00 704/246 |

OTHER PUBLICATIONS

Carney et al., "Monitoring Streams—A New Class of Data Management Applications," Brown Computer Science Technical Report, Proceeding VLDB, International Conference on Very Large Data Bases (28): (2002); pp. 1-13.
Dobra et al., "Processing complex Aggregate Queries over Data Streams," ACM SIGMOD (Jun. 4-6, 2002), pp. 1-12, Madison, WI.
Golubchik et al., "Multi-path continuous media streaming: what are the benefits?", Elsevier Science, Performance Evaluation: 49 (1-4), (Sep. 2002), pp. 429-449.
Kang et al., "Towards Streaming Media Traffic Monitoring and Analysis", Proc. of Asia-Pacific Network Operations and Management Symp. (APNOMS 2002) Jeju, Korea (Sep. 25-27, 2002), pp. 503-504; Dept of Comp. Sci. and Eng. POSTECH, Pohang KR.
Phatak et al., "A Novel Mechanism for Data Streaming Across Multiple IP Lins for Improving Throughput and Reliability in Mobile Environments," Infocom (2002), Conf. of the IEEE Comp.and Comm. Soc., Proceedings (21), pp. 1-11.

* cited by examiner

*Primary Examiner* — Jason Recek
(74) *Attorney, Agent, or Firm* — Cantor Colburn LLP

(57) ABSTRACT

A method includes receiving, by a computing device, a plurality of data streams from plurality of sources, distributing the data streams to a plurality of sinks on multiple hosts, receiving load information indicating a load on at least one of the plurality of sinks and adjusting the distribution of the data stream accordingly and instructing the plurality of sinks to write the data streams to a distributed data store.

14 Claims, 7 Drawing Sheets

DYNAMIC STREAMING DATA DISPATCHER

STATEMENT OF GOVERNMENT INTEREST

This invention was made with Government support under Contract Number H98230-07-C-0383. The U.S. Government has certain rights to this invention as provided for by the terms of the contract.

BACKGROUND

The present disclosure relates to dispatching data streams, and more specifically, to adaptable methods for dispatching incoming data streams to multiple hosts.

With the increased instrumentation and interconnectedness of the world, businesses are experiencing an exponential increase in the volume, variety and rate of data that requires processing. However, the ability to analyze and extract useful insight from this data poses a huge computational challenge, both in the systems and analytics spaces. As a result, large-scale, distributed data-analytics platforms for computing on streaming data and static data have been proposed to address these challenges.

Currently separate systems are used for analyzing streaming data and for processing large volumes of historic data stored on distributed storage systems. Increasingly, applications are requiring the integration of both systems in order to extract real-time insights from streaming data and apply these insights to make predictions from models formulate from historical data.

SUMMARY

According to one embodiment of the present disclosure, a method for distributing incoming data includes receiving a data stream from a source, distributing the data stream to a plurality of sinks on multiple hosts, receiving load information indicating a load on at least one of the plurality of sinks and adjusting the distribution of the data stream accordingly and instructing the plurality of sinks to write the data stream to a distributed data store.

According to another embodiment of the present disclosure, a method for distributing incoming data includes receiving a plurality of data streams from a plurality of data sources distributing the plurality data stream to a plurality of sinks on multiple hosts, receiving load information indicating a load on at least one of the plurality of sinks and adjusting the distribution of the data stream accordingly and instructing the plurality of sinks to write the plurality of data streams to a distributed data store.

According to another embodiment of the present disclosure, a computer program product for distributing incoming data streams, the computer program product includes a non-transitory computer readable storage medium having computer readable program code embodied therewith, the computer readable program code including computer readable program code configured to receive a plurality of data streams from a plurality of data sources, distribute the plurality data stream to a plurality of sinks on multiple hosts, receive load information indicating a load on at least one of the plurality of sinks and adjust the distribution of the data stream accordingly and instruct the plurality of sinks to write the plurality of data streams to a distributed data store.

According to yet another embodiment of the present disclosure, a system for distributing incoming data streams includes splitter for receiving a data stream from a data source, a plurality of sinks in operable communication with the splitter, a distributed data storage device in operable communication with the plurality of sinks and a load manager in operable communication with the plurality of sinks and the splitter, wherein the load manager instructs the splitter on distribution of the data stream to the plurality of sinks and received feedback from each of the sinks when they have written the data to the store.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 1:
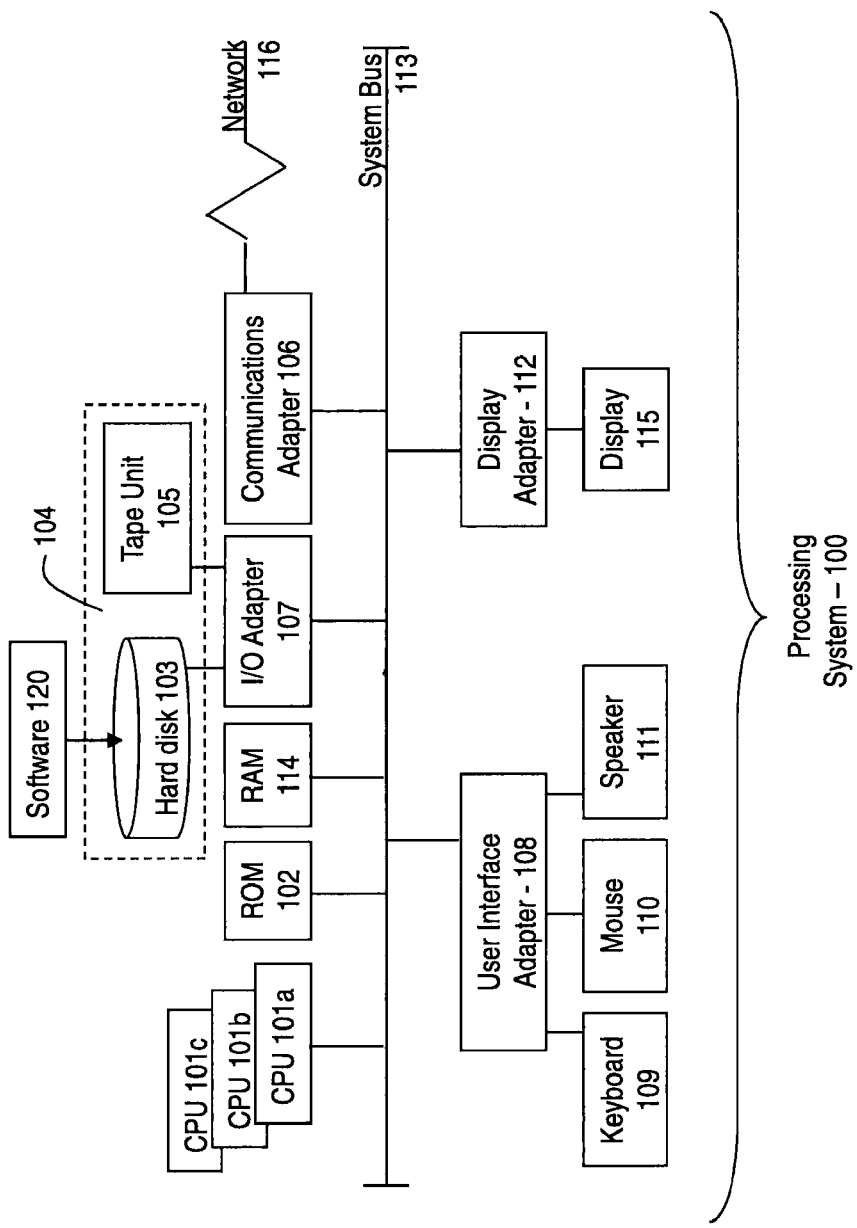
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101$a$, 101$b$, 101$c$, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

It will be appreciated that the system 100 can be any suitable computer or computing platform, and may include a terminal, wireless device, information appliance, device, workstation, mini-computer, mainframe computer, personal digital assistant (PDA) or other computing device.

Examples of operating systems that may be supported by the system 100 include Windows 95, Windows 98, Windows NT 4.0, Windows XP, Windows 2000, Windows CE, Windows Vista, Macintosh, Java, LINUX, and UNIX, or any other suitable operating system. The system 100 also includes a network interface 116 for communicating over a network. The network can be a local-area network (LAN), a metro-area network (MAN), or wide-area network (WAN), such as the Internet or World Wide Web. Users of the system 100 can connect to the network through any suitable network interface 116 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the system 100 includes machine readable instructions stored on machine readable media (for example, the hard disk 104) for capture and interactive display of information shown on the screen 115 of a user. As discussed herein, the instructions are referred to as "software" 120. The software 120 may be produced using software development tools as are known in the art. Also discussed herein, the software 120 may also referred to as a "command line testing tool" 120, an "a testing interface" 120 or by other similar terms. The software 120 may include various tools and features for providing user interaction capabilities as are known in the art.

Figure 2:
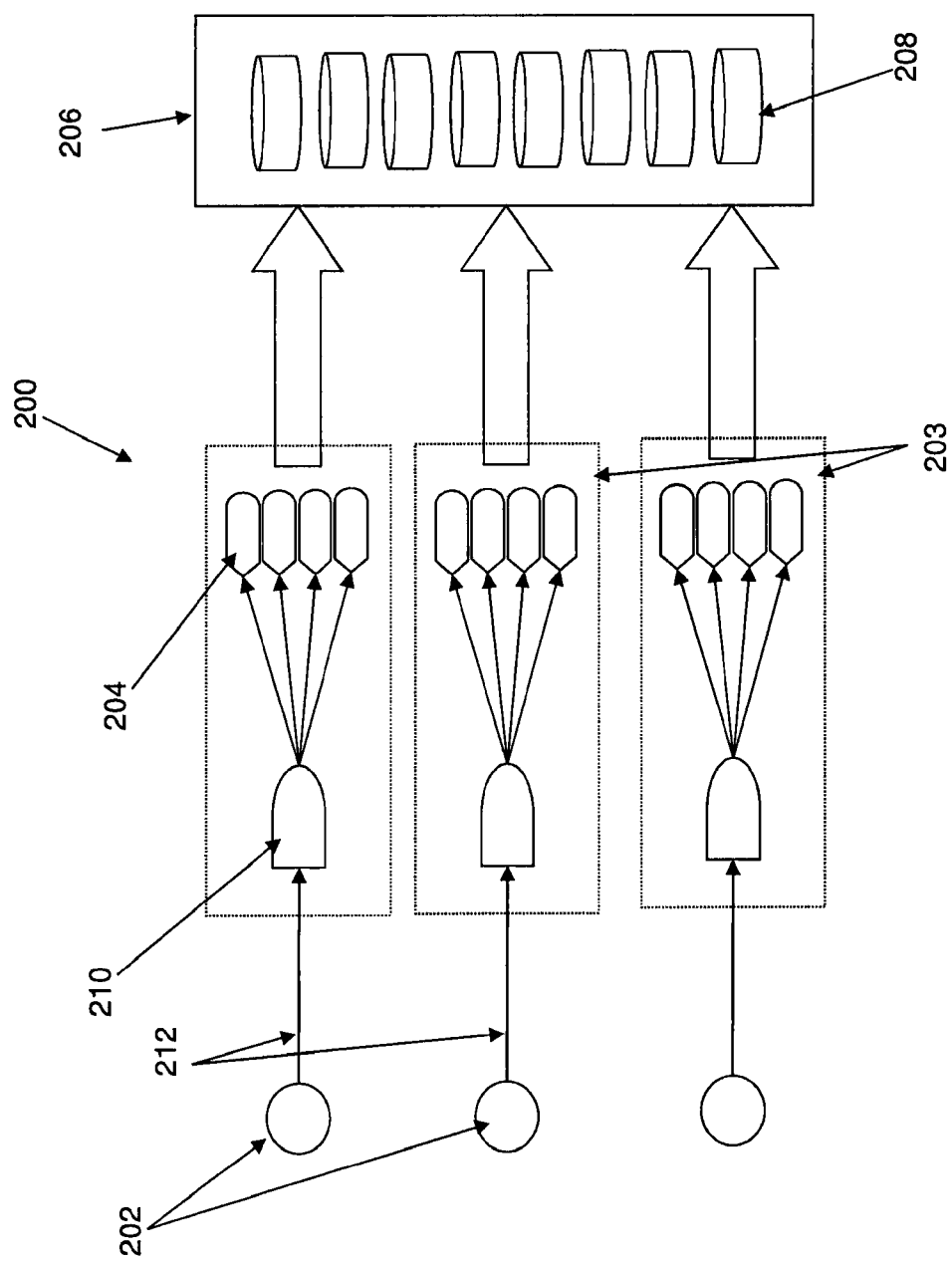
FIG. 2 is a block diagram illustrating the operation of a system for dispatching incoming data streams in accordance with an exemplary embodiment of the disclosure.

Referring now to FIG. 2, a block diagram of a system 200 for dispatching incoming data streams 212 from multiple sources 202 is illustrated. The system 200 includes a plurality of sinks 204, each located on one or more hosts 203, for buffering and writing to a distributed data store 206. The distributed data store 206 includes one or more data stores 208 which may also be located of different hosts. The system 200 also includes one or more splitters 210 which receive the incoming data streams 212 and redirects the data to one of plurality of sinks 204. The splitter 210 reads data streams 212 from a streaming data source 202 and forwards it to the sinks 204 based upon factors such as data type, size, rate etc. The splitter 210 determines the amount of data to be transferred to each sink 204 and is also tracks the progress of the write operations to the distributed data store 206.

Figure 3:
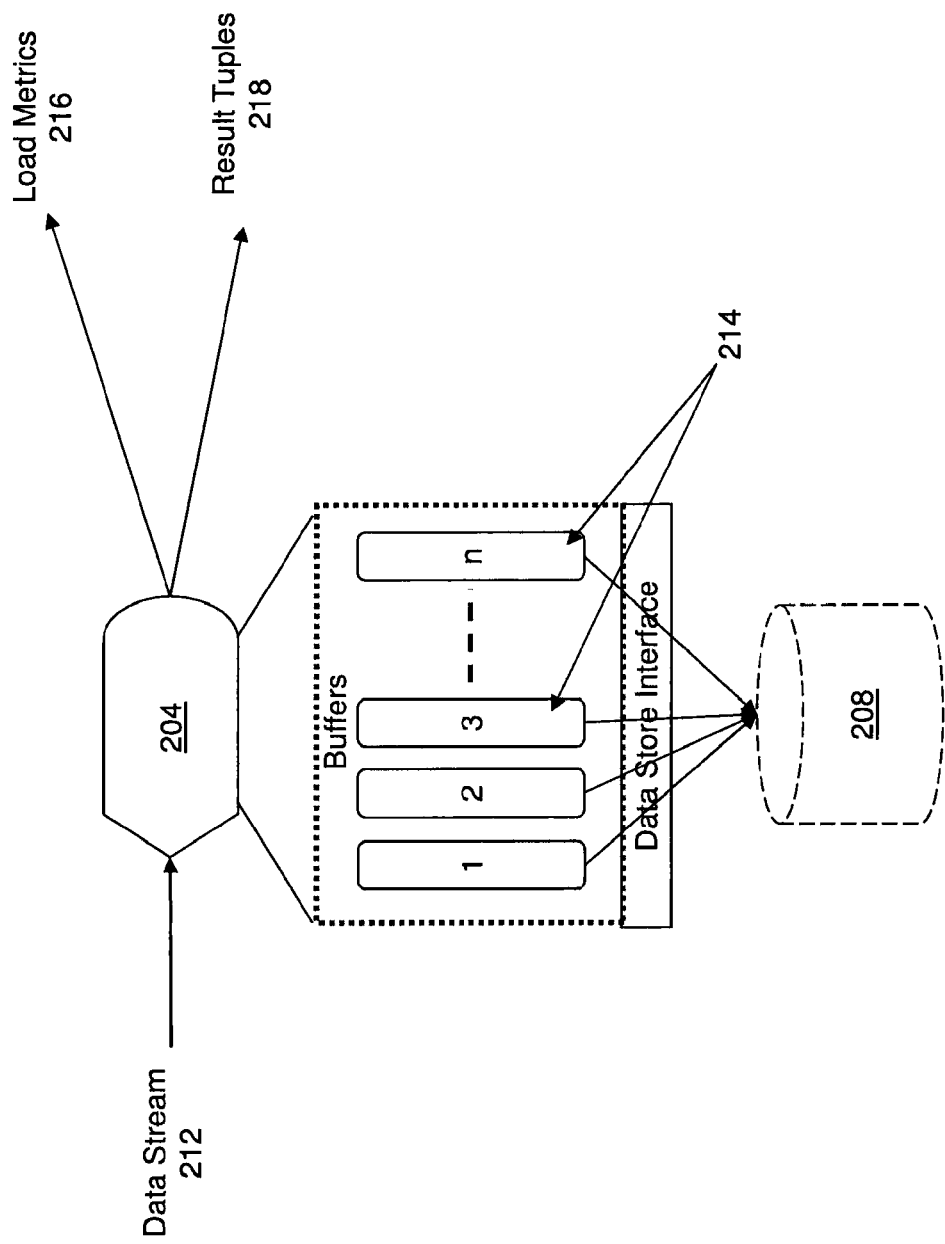
FIG. 3 is a block diagram illustrating the operation of a sink of the system for dispatching incoming data streams in accordance with an exemplary embodiment of the disclosure.

FIG. 3 is a block diagram illustrating the operation of a sink 204. The sink 204 buffers incoming data stream 212 and sequentially writes the data to one or more buffers 214. The sink 204 then writes the data from the buffers 214 to one of data store 208 of the distributed data store 206. In exemplary embodiments, the sink 204 can be configured to write buffers to the distributed data store 206 automatically if certain conditions are met. For example, if the buffer reaches a pre-configured maximum size or if a specific amount of time has elapsed since the buffer first became active. The data stream 212 received from the splitter 210 produces both data tuples 228, or packets, and control tuples 226. The control tuples 226 can be used to instruct the sink 204 to write the buffer 214 to a data store 208. In exemplary embodiments, the sink 204 generates both load metrics 216 and result tuples 218. The load metrics 216 contain information on the load on the writer including number of active writers, number of available buffers etc. The result tuples 218 contain information on which write operations were completed and if any write operations failed.

The sink 204 is responsible for buffering streaming data and writing it to a data store 208. In exemplary embodiments multiple sinks 204 can be deployed on a single or on multiple hosts 203. For example, in a distributed network there may be one sink 204 per host 203 in the network. In an exemplary embodiment, the write operations to the data store 208 are handled asynchronously and do not affect the buffering process. The sink 204 can be configured to write one or more buffers 214 concurrently to the data store 208. The maximum number of buffers 214, maximum size of each buffer 214 and the number of concurrent writers can be configured at application deployment time based on the available memory and CPU capacity of the hosts 203 in the network. In exemplary embodiments, the sink 204 can be designed to operate in one of two modes. In the first mode, the sink 204 buffers incoming data up to a pre-configured maximum size and then enqueues the buffer 214 for writing to the data store 208. In the second mode, the sink 204 will buffer data until signaled by the splitter 210 to cease writing to the buffer 214. Once the sink 204 receives instructions from the splitter 210, it will cease adding to the current buffer 214, enqueue the buffer 214 for writing to the data store 208 and continue to accumulate incoming data into a separate buffer 214.

Figure 4:
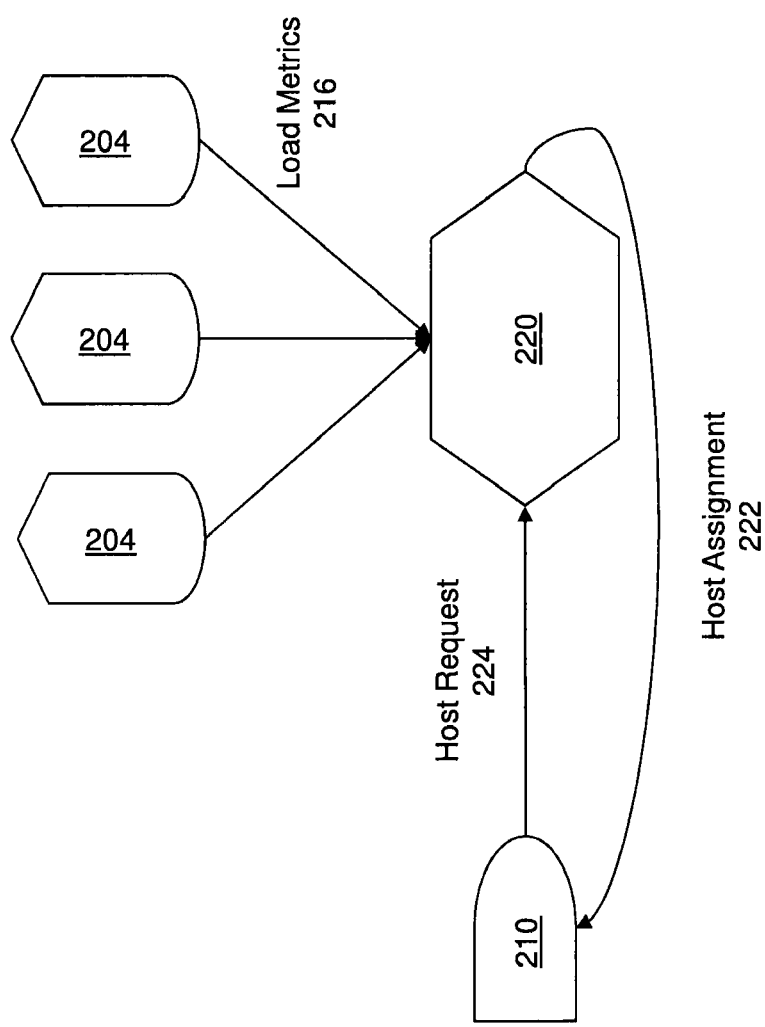
FIG. 4 is a block diagram illustrating the operation of a load manager of the system for dispatching incoming data streams in accordance with an exemplary embodiment of the disclosure.

Turning now to FIG. 4, a block diagram illustrating the operation of a load manager 220 is illustrated. In exemplary embodiments, the load manager 220 monitors the load on each host 203 by checking the load of all the writers on that host 203. The load manager 220 may also determine the load on the hosts 203 by receiving load metrics 216 from the sink 204. Based upon the load of each host 203, the load manger 220 determines the least busy hosts to send data to and sends appropriate host assignments 222 to the splitter 210. In addition, the load manager 220 may receive host requests 224 from the splitter 210 requesting a new host. The load manager 220 can occasionally choose to not allocate any host based on load information. In exemplary embodiments, the load manager 224 is used as a load balancing mechanism to ensure proper distribution of work based on the current load. The load manager 220 may include a configurable dispatch policy that is used to ensure that input data streams 212 are properly distributed by the splitter 210. In one embodiment, the load manager 220 instructs the splitter 210 to distribute the data streams 212 to the plurality of sinks 204 in a balanced manner, i.e., the load manager 220 attempts to maintain similar loads on each of the plurality of sinks 204. The load manager 220 may instruct the splitter to distribute the data streams 212 to the plurality of sinks 204 based upon the load on each of the plurality of sinks 204 and the total size of data being sent to each sink 204.

Figure 5:
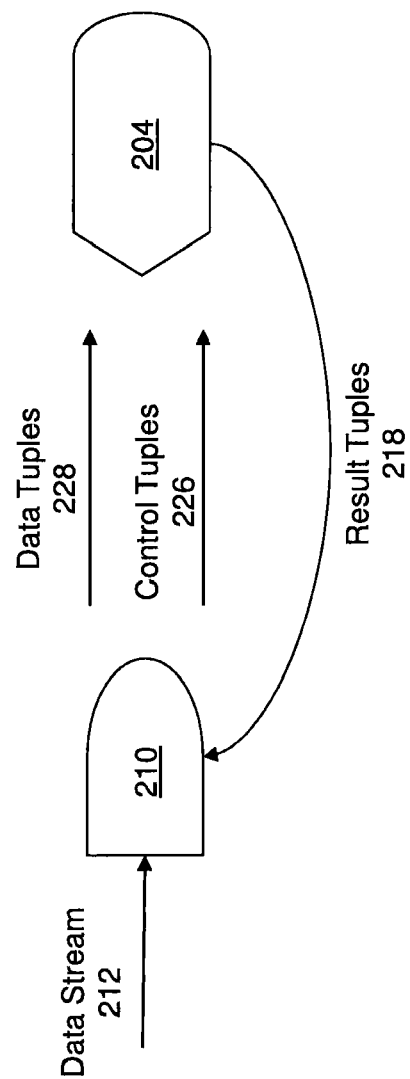
FIG. 5 is a block diagram illustrating the operation of a splitter of the system for dispatching incoming data streams in accordance with an exemplary embodiment of the disclosure.

Continuing now with reference to FIG. 5, the splitter 210 receives incoming data streams 212 and sends the data tuples 228 to one of the plurality of sinks 204. The splitter 210 receives host assignments 222 from the load manager 220 and result tuples 218 from the sinks 204. Based upon the information received from the sink 204 and the load manger 220, the splitter 210 decides which data tuples 228 of the incoming data stream 212 to send to each sink 204. In exemplary embodiments, the splitter 210 is configured to direct the data tuples 228 based on the type of data that is being written. For example, the splitter 210 could determine which sink 204 to send the data tuples 228 to based upon the size of the data, the time the data will be sent, or on other information contained in the data. In exemplary embodiments, the splitter 210 also receives result tuples 218 from the sink 204, which indicate if the write operations were successful or not. Since the splitter 210 controls when the data is written to the distributed data store 206, it can adjust to changes in incoming data rates and send "write" requests to the sink 204 with different data sizes.

In exemplary embodiments, after the splitter 210 determines that the sink 204 has enough data to be written to a data store 208, the splitter 210 sends the sink 204 a control tuple 226 that includes a "write" request. Once the sink 204 receives the "write" request from the splitter 210, the sink 204 will cease buffering to the current active buffer and enqueue the buffer 214 for writing to the distributed data store 206. In addition, the control tuples 226 can be used to send other messages from the splitter 210 to the sink 204. Such messages can include, for example, a "discard" request instructing the sink 204 to discard a buffer 214. The control tuples 226 can be used for replication and fault-tolerance. The sink 204 generates result tuples 228 which are used to inform the splitter 210 if requests received, in the form of control tuples 226, from the splitter 210 have been completed or have failed. The result tuples 228 can be received by and acted on by the splitter 210 and any other external entity. In exemplary embodiments, the splitter 210 can be configured to send the same data tuple 228 to multiple sinks 204 and if a particular sink 204 fails to write to the distributed data store 206, another sink 204 can be asked to write the data to the distributed data store 206. In addition, the additional sinks 204 can be asked to discard data if the write was successful. The degree to which the system uses replication can be configured by a user.

In an exemplary embodiment, the data tuple 228 includes a group identification number, a sequence number and a payload. The group identification number may be a unique number for every group of tuples being written together. The sequence number may be a tuple counter for current group and the payload includes the actual data to be written.

In an exemplary embodiment, the control tuple 226 includes request identification number, a maximum sequence number and a type variable. The request identification number is a unique identification number for the current request. The maximum sequence number is a sequence number of the last tuple in group. The type variable indicate that type of action that the control tuple 226 is instruction the sink 204 to perform such as write, discard, etc. In addition, the control tuple 226 can also be designed to contain additional application specific data.

In an exemplary embodiment, the result tuple 218 includes a request identification number and a type variable. The request identification number is a unique identification number of the request which included the write instruction. The type variable indicates the result being reported by the result tuple 218 such as a write success or failure. In addition, the result tuple 218 can also be designed to contain additional application specific data.

In an exemplary embodiment, the host request 224 includes a request identification number, a splitter identification number, a number of hosts variable, and a current host identification number. The request identification number is a random number assigned to the request. The splitter identification number is a unique identification number of the splitter that the request is being sent from. The number of hosts variable is the number of hosts requested by the splitter and the current host identification number is the identification number of the hosts currently being used by the splitter. In addition, the host request 224 can also be designed to contain additional application specific data. In exemplary embodiment, the host request 224 can be sent at any time by the splitter and it is typically sent before the splitter sends a write request to the sink.

In an exemplary embodiment, the host assignment 222 includes a request identification number, a splitter identification number, a type variable, and a host identification number. The request identification number is the number assigned to the request 224 that the host assignment 222 is in response to. The splitter identification number is the number assigned to the splitter for which the host assignment 222 is requested. The type variable indicates whether the requested host is available or un-available and the host identification number is the identification number of the currently assigned hosts. In addition, the host assignment 222 can be designed to contain additional application specific data.

Figure 6:
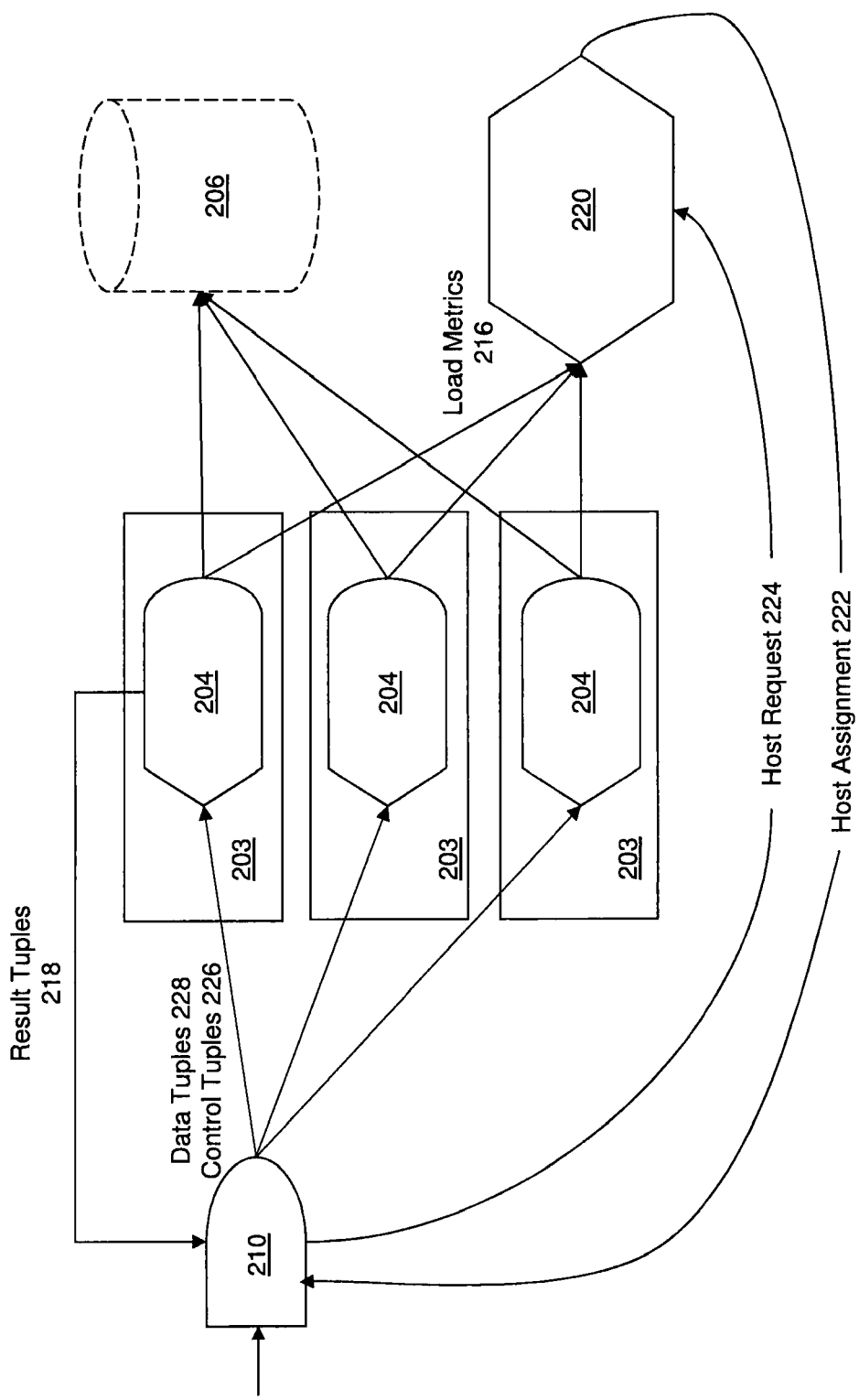
FIG. 6 is a block diagram illustrating the operation of a system for dispatching incoming data streams from a single source in accordance with an exemplary embodiment of the disclosure.

Referring now to FIG. 6, a block diagram illustrating the operation of a system for dispatching incoming data streams from a single source is shown is shown. The system includes a splitter 210 that receives and distributes an incoming data stream and a plurality of hosts 203 that each include a sink 204 which receive data from the splitter 210. The splitter 210 sends both data tuples 228 and control tuples 226 to the sinks 204. The sinks 204 write data to the distributed data store 206 and send load metrics 216 to the load manager 220 and result tuples 218 to the splitter 210. The splitter 210 receives hosts assignment tuples 222 from the load manager 222 and sends the load manager 220 host requests 224.

Figure 7:
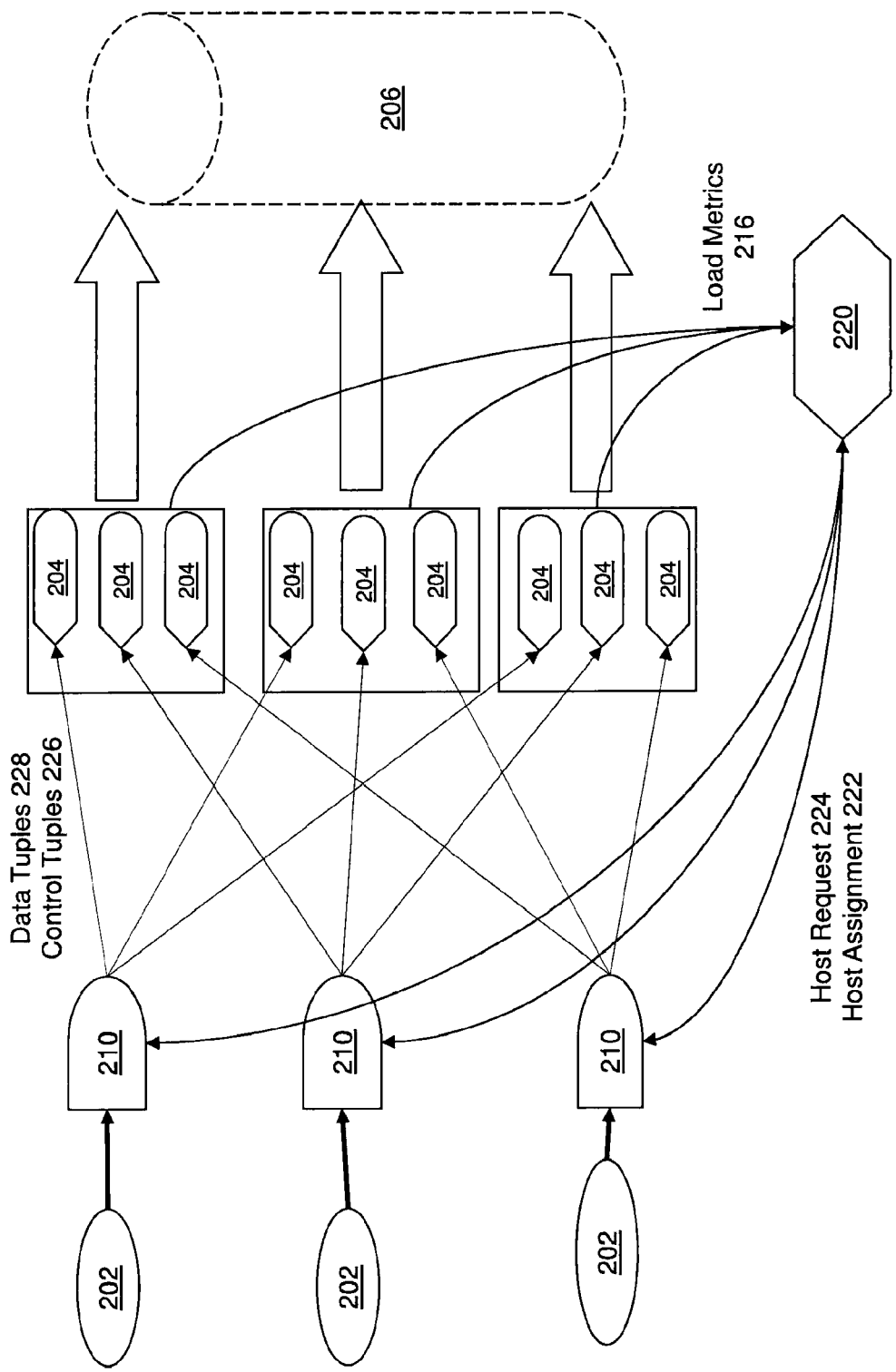
FIG. 7 is a block diagram illustrating the operation of a system for dispatching incoming data streams from multiple sources in accordance with an exemplary embodiment of the disclosure.

Referring now to FIG. 7, a block diagram illustrating the operation of a system for dispatching incoming data streams from multiple sources is shown. The system includes multiple splitters 210 that receive data from multiples sources 202. The splitters 210 distribute the incoming data streams to a plurality of hosts 203 that each include a plurality of sinks 204 which receive distributed data from the splitter 210. The splitters 210 send both data tuples 228 and control tuples 226 to the sinks 204. The sinks 204 write data to the distributed data store 206 and send load metrics 216 to the load manager 220 and result tuples to the splitter 210. The splitter 210 receives hosts assignment tuples 222 from the load manager 222 and sends the load manager 220 host requests 224.

In the system shown in FIG. 7, each streaming data source 202 can potentially have a different and variable data rate. Since the data will be written to the same repository, there needs to be coordination between the writers so that the load across all the writers is distributed evenly. Accordingly, in exemplary embodiments each data source 202 is coupled with a unique splitter 210. This ensures that the splitter 210 can adapt to the data rate of the source 202 without affecting other data sources 202. To balance the load across the hosts 203 in the network, the load manager 220 will be shared across the data sources. The load manager 220 accepts load information from all the sinks 204 in the system and uses this information to determine the overall load on each host 203 and can intelligently decide on how the load should be distributed to enhance performance.

In an exemplary embodiment, the system for distributing incoming data streams is advantageous in that it eliminates the need for intermediate data storage mechanisms because the streaming data need not be stored into files which are then uploaded to the data storage facility. In addition, the system is advantageous because it is designed to adjust to multiple streams with varying data rates. Since the splitter controls when the data is written to the data store, the splitter can adjust to incoming rates and send "write" requests to sink with different data sizes. Another advantage of the system is that it can be designed to have a configurable degree of fault-tolerance.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated While the preferred embodiment to the disclosure had been described, it will be understood that those skilled in the art, both now and in the future, may make various improvements and enhancements which fall within the scope of the claims which follow. These claims should be construed to maintain the proper protection for the disclosure first described.

What is claimed is:

1. A method, comprising:
  receiving, by a computing device, a data stream from a source to be stored on a distributed data store;
  distributing the data stream to a plurality of sinks on multiple hosts by sending a plurality of data tuples to the plurality of sinks, wherein each of the sinks on the multiple hosts are configured to buffer the data stream and wherein the distributed data store is configured to receive data from each of the multiple hosts, and wherein distributing the data stream to the plurality of sinks on multiple hosts comprises sending a data tuple from the plurality of data tuples to two or more of the plurality of sinks;
  receiving load information indicating a load on at least one of the plurality of sinks and responsively adjusting the distribution of the data stream;
  sending, by the computing device, to a first sink from the plurality of sinks, a control tuple, the control tuple comprising one of a write request or a discard request, the write request instructing the first sink to write data stored on the first sink to the distributed data store based on a buffer size and a load on the first sink, and the discard request instructing the first sink to discard the data stored on the first sink;
  receiving a result tuple from the first sink indicating a success or failure of writing the data stream to the distributed data store; and
  sending the control tuple to a second sink from the plurality of sinks in response to the result tuple from the first sink indicating a failure of writing the data stream to the distributed data store by the first sink.

2. The method of claim 1, wherein a data rate of the data stream is variable.

3. The method of claim 1, wherein distributing the data stream to a plurality of sinks on multiple hosts is performed in a balanced manner.

4. The method of claim 1, wherein writing the data stream to the distributed store comprises simultaneously writing a plurality of buffered data tuples on the plurality of sinks to the distributed data store.

5. The method of claim 1, wherein the data stream is distributed to the plurality of sinks based on a total size of data being sent to each sink.

6. A method, comprising:
  receiving, by a computing device, a plurality of data streams from a plurality of data sources to be stored on a distributed data store;
  distributing the plurality data stream to a plurality of sinks on multiple hosts by sending a plurality of data tuples to the plurality of sinks, wherein each of the sinks on the multiple hosts are configured to buffer the data stream and wherein the distributed data store is configured to receive data from each of the multiple hosts, wherein distributing the data stream to the plurality of sinks on multiple hosts comprises sending a data tuple from the plurality of data tuples to two or more of the plurality of sinks;
  receiving load information indicating a load on at least one of the plurality of sinks and responsively adjusting the distribution of the data stream;
  sending, by the computing device, to a first sink from the plurality of sinks, a control tuple, the control tuple comprising one of a write request or a discard request, the write request instructing the first sink to write data stored on the first sink to the distributed data store based on a buffer size and a load on the first sink, and the discard request instructing the first sink to discard the data stored on the first sink;

receiving a result tuple from the first sink indicating a success or failure of writing the data stream to the distributed data store in response to the control tuple; and sending the control tuple to a second sink from the plurality of sinks in response to the result tuple from the first sink indicating a failure of writing the data stream to the distributed data store by the first sink.

7. The method of claim 6, where a data rate of at least one of the plurality of data streams is variable.

8. The method of claim 6, wherein writing the plurality of data streams to the distributed store comprises simultaneously writing a plurality of buffered data tuples on the plurality of sinks to the distributed data store.

9. A computer program product for distributing incoming data streams, the computer program product comprising:

a non-transitory computer readable storage medium having computer readable program code embodied therewith, the computer readable program code comprising:
computer readable program code configured to:
receive, by a computing device a plurality of data streams from a plurality of data sources to be stored on distributed data store;
distribute the plurality data stream to a plurality of sinks on multiple hosts by sending a plurality of data tuples to the plurality of sinks, wherein each of the sinks on the multiple hosts are configured to buffer the data stream and wherein the distributed data store is configured to receive data from each of the multiple hosts, wherein distributing the data stream to the plurality of sinks on multiple hosts comprises sending a data tuple from the plurality of data tuples to two or more of the plurality of sinks;
receive load information indicating a load on at least one of the plurality of sinks and responsively adjust the distribution of the data stream;
send, by the computing device, to a first sink from the plurality of sinks, a control tuple, the control tuple comprising one of a write request or a discard request, the write request indicative for the first sink to write data stored on the first sink to the distributed data store based on a buffer size and a load on the first sink, and the discard request indicative for the first sink to discard the data stored on the first sink;
receive a result tuple from the first sink indicating a success or failure of writing the data stream to the distributed data store in response to the control tuple; and
send the control tuple to a second sink from the plurality of sinks in response to the result tuple from the first sink indicating a failure of writing the data stream to the distributed data store by the first sink.

10. The computer program product of claim 9, wherein distributing the plurality of data streams to a plurality of sinks on multiple hosts is performed in a balanced manner.

11. A system, comprising:
a splitter for receiving a data stream from a data source;
a plurality of sinks in operable communication with the splitter;
a distributed data storage device in operable communication with the plurality of sinks; and
a load manager in operable communication with the plurality of sinks and the splitter, wherein the load manager instructs the splitter on distribution of the data stream to the plurality of sinks and instructs the plurality of sinks to write data stored on the plurality of sinks to the distributed data store based on a buffer size and a load on the plurality of the sinks; and wherein the splitter is configured to:
split the data stream into a plurality portions;
send a first data tuple from comprising a portion of the data stream to a first sink and a second sink, the first sink and the second sink being from the plurality of sinks;
send a control tuple to the first sink, the control tuple comprising a write request for the first sink to write the portion of the data stream in the data tuple to the distributed data store;
receive a result tuple from the first sink indicating a success or failure of writing the portion of the data stream to the distributed data store; and
send the control tuple to a second sink from the plurality of sinks in response to the result tuple from the first sink indicating a failure of writing the data stream to the distributed data store by the first sink.

12. The system of claim 11, further comprising a second splitter for receiving a second data stream from a second data source, wherein the second splitter is in operable communication with the plurality of sinks and the load manager instructs the splitter and the second splitter on distribution of the data streams to the plurality of sinks.

13. The system of claim 11, wherein the data stream has a variable rate.

14. The system of claim 11, wherein the control tuple comprises a discard request for the first sink to discard the portion of the data stream from the data tuple that the first sink stores in a buffer.

* * * * *